(12) United States Patent
Deng

(10) Patent No.: US 9,546,642 B2
(45) Date of Patent: Jan. 17, 2017

(54) ENERGY-STORING AND POWER-GENERATING SYSTEM AND METHOD FOR A VERTICAL-AXIS WIND GENERATOR

(76) Inventor: Yunhe Deng, Guangdong (CN)

( * ) Notice: Subject to any disclaimer, the term of this patent is extended or adjusted under 35 U.S.C. 154(b) by 435 days.

(21) Appl. No.: 14/353,321

(22) PCT Filed: Jul. 9, 2012

(86) PCT No.: PCT/CN2012/078330
§ 371 (c)(1),
(2), (4) Date: Apr. 22, 2014

(87) PCT Pub. No.: WO2013/060165
PCT Pub. Date: May 2, 2013

(65) Prior Publication Data
US 2014/0255166 A1    Sep. 11, 2014

(30) Foreign Application Priority Data
Oct. 29, 2011   (CN) .......................... 2011 1 0334441

(51) Int. Cl.
*F03D 3/00* (2006.01)
*F03B 13/00* (2006.01)
(Continued)

(52) U.S. Cl.
CPC ............... *F03D 3/005* (2013.01); *F03B 13/00* (2013.01); *F03B 17/005* (2013.01); *F03D 3/02* (2013.01); *F03D 9/001* (2013.01); *F03D 9/008* (2013.01); *F03D 9/14* (2016.05); *F03D 9/17* (2016.05); *F03D 13/20* (2016.05); *F05B 2240/212* (2013.01); *F05B 2260/85* (2013.01); *F05B 2260/902* (2013.01); *Y02E 10/728* (2013.01); *Y02E 10/74* (2013.01); *Y02E 60/15* (2013.01); *Y02E 60/17* (2013.01); *Y02E 70/30* (2013.01)

(58) Field of Classification Search
CPC ............... F03D 3/005; F03D 9/00; H02P 9/04
See application file for complete search history.

(56) References Cited

U.S. PATENT DOCUMENTS 4,112,311 A * 9/1978 Theyse ..................... F03D 7/06
                                                                        290/44
4,421,967 A * 12/1983 Birgel ..................... F03D 9/006
                                                                        219/618
(Continued)

*Primary Examiner* — Thomas Denion
*Assistant Examiner* — Shafiq Mian
(74) *Attorney, Agent, or Firm* — Jackson IPG PLLC; Demian K. Jackson

(57) ABSTRACT

The energy-storing and power-generating system comprises an energy-storing system and a power-generating system. The energy-storing system comprises a high pressure gas generator, a water storage apparatus and a water turbine. The high pressure gas generator comprises at least one sealed high pressure gas tank (2) and an air compressor (1) cooperating therewith. The water storage apparatus comprises at least one sealed water tank (3). The air compressor is in communicated with the high pressure gas tank via a gas inlet pipe (4), while the high pressure gas tank is in communication with the water tank via a gas outlet pipe (5). The water tank is connected to a water inlet of the water turbine (10) via a water outlet pipe. Blades (102) of the water turbine are connected to the power generator via main gears.

12 Claims, 10 Drawing Sheets

(51) Int. Cl.
    *F03B 17/00*      (2006.01)
    *F03D 3/02*      (2006.01)
    *F03D 9/00*      (2016.01)

(56) References Cited

U.S. PATENT DOCUMENTS

| | | | | |
|---|---|---|---|---|
| 4,426,846 | A * | 1/1984 | Bailey | F03D 9/008 60/398 |
| 4,464,579 | A * | 8/1984 | Schwarz | F03D 7/026 290/44 |
| 5,384,489 | A * | 1/1995 | Bellac | F03D 9/006 290/44 |
| 6,718,761 | B2 * | 4/2004 | Merswolke | F03D 9/001 60/398 |
| 6,979,170 | B2 * | 12/2005 | Dery | F03D 3/061 415/4.2 |
| 7,740,401 | B2 * | 6/2010 | Kozlowski | A47J 43/042 366/317 |
| 7,804,182 | B2 * | 9/2010 | DeAngeles | F03B 17/005 290/43 |
| 7,877,992 | B2 * | 2/2011 | Chen | F03B 13/06 60/398 |
| 8,030,790 | B2 * | 10/2011 | Kamenov | F03B 13/06 290/43 |
| 8,546,972 | B2 * | 10/2013 | Deng | F03D 3/005 290/44 |

* cited by examiner

ENERGY-STORING AND POWER-GENERATING SYSTEM AND METHOD FOR A VERTICAL-AXIS WIND GENERATOR

FIELD OF THE INVENTION

The present invention relates to the field of vertical-axis wind generation, particularly to a large vertical-axis wind generator having functions of grid-connected and off-grid power generation.

BACKGROUND OF THE INVENTION

People cannot live and work without electricity. If without electricity, the world will be unimaginable, life will be tedious or uninteresting, and the production will be stagnated to directly cause collapse of the whole society productivity. Electrical energy is so important that countries all over the world pay considerable attention to the development of electrical energy at present. Common power generation includes wind power generation, hydroelectric generation, thermal power generation and nuclear power generation, where the thermal power generation and the nuclear power generation are being abandoned gradually now because they cause substantial pollution and do not meet the requirements of human development, while the hydroelectric generation has few resources and is far from sufficient to meet people's demands for electricity. Therefore, the clean and environmentally friendly wind power generation, with rich resources, becomes a main direction of development in future.

At present, large vertical-axis wind generators using grid-connected power generation still have many problems, and these problems are all caused by the unstable factors of natural wind. At a low wind speed, the large vertical-axis wind generators are difficult to start or simply cannot be started, as a result, resources are wasted by generators; at a normal wind speed, although the large vertical-axis wind generators can be started to work, the generators have low power generation efficiency and are often not in full-capacity state; and at an ultrahigh wind speed, the rotation speed of the generators is quickened obviously, even beyond the rated power of the generators, in this case, the generators are in risk of damage and components thereof are likely to be damaged, meanwhile, ultrahigh power output may cause hazards. In addition, as the natural wind is constantly changing in speed, i.e., a small wind speed, a low wind speed or a high wind speed, the power generated by the generators is extremely unstable, which will impact on the power grid when the generators are connected thereto.

The current power supply system in China works as follows: transformer substations supply electricity generated by the power generation equipment to power distribution stations in each area, and then the power distribution stations supply electricity to residents and factories in this area. However, for remote areas, grid-connected power supply results in problems of high cost, inconvenient maintenance and the like, further results in difficult electricity supply to remote areas. This has become a problem urgent to be solved by governments at all levels at present. Off-grid power generation is undoubtedly the best way to solve this problem. Therefore, how to utilize wind power generation to solve this problem has become a direction of research and development.

No matter for grid-connected wind power generation or off-grid wind power generation, people have high demands on electricity for production activities in daylight, so transformer substations are in quite short supply of electricity, sometimes even supply electricity area by area to ease the shortage of electricity; while as people have low demands on electricity for production activities in night, the transformer substations have surplus electricity which however cannot be utilized in people's production activities and lives and is thus wasted. Therefore, how to utilize the wasted part of electricity is another problem to be solved for wind generators in grid-connected or off-grid generation.

SUMMARY OF THE INVENTION

A first technical problem to be solved by the present invention is to provide an energy-storing and power-generating system for a vertical-axis wind generator, by which, the power generated will not impact on the power grid when the generator is connected to a power grid, and electrical power can be converted into energy in other forms for storage and then energy in other forms can be converted back to electrical power, thereby solving the problem of electrical power waste to a certain extent and meanwhile solving the problem of a large vertical-axis wind generator in off-grid power generation.

A second technical problem to be solved by the present invention is to provide an energy-storing and power-generating method for a vertical-axis wind generator, by which, the power generated will not impact on the power grid when the generator is connected to a power grid, and electrical power can be converted into energy in other forms for storage and then energy in other forms can be converted back to electrical power, thereby solving the problem of electrical power waste to a certain extent and meanwhile solving the problem of a large vertical-axis wind generator in off-grid power generation.

To solve the first technical problem, the present invention employs the following technical solution: an energy-storing and power-generating system for a vertical-axis wind generator is provided, including an energy-storing system and a power-generating system, where the power-generating system includes a central pillar and more than one power generation unit disposed on the central pillar, the power generation unit including a φ-shaped wind wheel pivoted to the central pillar, main gears sheathed on the central pillar, more than two power generators and an installation platform for installing the power generators, the main gears being disposed below the wind wheel and connected to the wind wheel, the main gears being coupled to spindles of the power generators via a set of gear transmission system, respectively; the energy-storing system includes a high pressure gas generator, a water storage apparatus and a water turbine, the high pressure gas generator including at least one high pressure gas tank and an air compressor cooperating therewith, the water storage apparatus including at least one water tank, the air compressor being in communication with the high pressure gas tank via a gas inlet pipe, the high pressure gas tank being in communication with the water tank via a gas outlet pipe, the water turbine being disposed below the power generation unit close to the ground, the water turbine including an impeller surrounding the central pillar and a shell enclosing the impeller, a water inlet and a water outlet being provided on the shell, the water tank being connected to the water inlet of the water turbine via a water outlet pipe, the impeller of the water turbine being connected to the main gear of the power generation unit close to the ground; and, the power-generating system supplies power to the air compressor via cables.

As an improvement, a first bearing is provided at the upper end of the wind wheel, an inner ring of the first bearing being fixedly sheathed on the central pillar while an outer ring thereof being fixedly connected to the upper end of the wind wheel; and, a second bearing is provided at the lower end of the wind wheel, an inner ring of the second bearing being fixedly sheathed on the central pillar while an outer ring thereof being fixedly connected to the lower end of the wind wheel and the main gears, the wind wheel being pivoted to the central pillar via the first bearing and the second bearing.

As an improvement, a coupler and a brake apparatus are provided between the main gears and the wind wheel, the upper end of the coupler being connected to the lower end of the wind wheel while the lower end thereof being connected to the main gears, the brake apparatus including an annular brake disc disposed on the coupler and more than one braking device fixed on the pillar, the braking device including brakes and a power source for driving the brakes, the brakes being in cooperation with the brake disc.

As an improvement, the central pillar is of a reinforced concrete structure, the center of the central pillar being provided with a passage through from the bottom to the top, the installation platform surrounding the central pillar, the installation platform and the central pillar being formed integrally by grouting, installation screw holes being provided on the installation platform, the inner-rotor power generators being fixed on the installation platform via bolts.

As an improvement, the water storage apparatus includes two water tanks, the water outlet of the water turbine being in communication with the water tanks via a water return pipe.

As an improvement, the high pressure gas generator includes two high pressure gas tanks and two air compressors, the two high pressure gas tanks being a first high pressure gas tank and a second high pressure gas tank, respectively, the two air compressors being a first air compressor and a second air compressor, respectively, the second air compressor being in communication with the first high pressure gas tank via a first gas pipe, the first air compressor being in communication with the gas outlet pipe via a second gas pipe.

As an improvement, the gas inlet pipe, the gas outlet pipe, the first gas pipe, the second gas pipe, the water outlet pipe and the water return pipe are all provided thereon with valves; and pressurizing equipment is provided on the water outlet pipe.

To solve the second technical problem, the present invention employs the following technical solution: an energy-storing and power-generating method for a vertical-axis wind generator is provided, including an energy-storing system and a power-generating system therein, the power-generating system including more than one power generation unit disposed on a central pillar, the power generation unit including a φ-shaped wind wheel pivoted to the central pillar, main gears sheathed on the central pillar, more than two power generators and an installation platform for installing the power generators, the energy-storing system including a high pressure gas generator, a water storage apparatus and a water turbine, the high pressure gas generator including at least one high pressure gas tank and an air compressor cooperating therewith, the water storage apparatus including at least one water tank; the specific power-generating method includes the following steps:

(1) the power-generating system conveys surplus electricity to the air compressor of the energy-storing system via cables;

(2) the air compressor is powered and compresses air into the high pressure gas tank via the gas inlet pipe so that the conversion from electrical energy to the molecular potential energy of air is completed due to the increasing of the molecular potential energy of air in the high pressure gas tank;

(3) the water tank is filled with water, the high pressure gas in the high pressure gas tank is released into the water tank via the gas outlet pipe in order to increase the air pressure in the water tank when it is required to activate the energy-storing system, water in the water tank is drained to the water turbine via the water outlet pipe when the air pressure reaches a specified value, so that the water in the water outlet pipe generates certain kinetic energy under the action of air pressure, and the conversion from the molecular potential energy of air to the kinetic energy of water is thus completed; and (4) the water having kinetic energy flows to the water turbine along the water outlet pipe and pushes the impeller of the water turbine to rotate, so that the conversion from the kinetic energy of water to mechanical energy is completed; and, the impeller of the water turbine drives the main gear of the power generation unit close to the ground to rotate, and then the main gear transfers the power to more than two power generators via a gear transmission system, so that the conversion from mechanical energy to electrical energy is completed finally.

As an improvement, the high pressure gas generator includes two high pressure gas tanks and two air compressors, the two high pressure gas tanks being a first high pressure gas tank and a second high pressure gas tank, respectively, the two air compressors being a first air compressor and a second air compressor, respectively, the second air compressor being in communication with the first high pressure gas tank via a first gas pipe, the first air compressor being in communication with the gas outlet pipe via a second gas pipe; and, Step (2) is specifically as follows: the first air compressor compresses air into the first high pressure gas tank via a gas inlet pipe so that the molecular potential energy of air in the first high pressure gas tank increases, and the second air compressor compresses air into the second high pressure gas tank via a gas inlet pipe so that the molecular potential energy of air in the second high pressure gas tank increases.

As an improvement, the water storage apparatus includes two water tanks, the water outlet of the water turbine being in communication with the water tanks via water return pipes; and Step (3) is specifically as follows: the first water tank or the second water is filled with water, so that the water tank filled with water is a working water tank while the water tank without water is a spare water tank, the high pressure gas in the high pressure gas tanks is released into the working water tank via gas outlet pipes in order to increase the air pressure in the working water tank when it is required to activate the energy-storing system to generate power, water in the working water tank is drained to the water turbine via the water outlet pipe when the air pressure reaches a designated value, water enters the spare water tank via the water return pipe after acting on the water turbine, until the water in the working water tank is all transferred into the spare water tank, then the spare water tank becomes a new working water tank while the original working tank becomes a new spare water tank, so that power generation is performed in such a cycle.

Compared with the prior art, the present invention has the following advantages:

1) when the wind wheel is difficult to activate the power generators at a low wind speed, the water turbine may assist for activation, so that the power generators may be activated easily under the common driving of the wind wheel and the water turbine;

2) under the normally operating state of the power generators, the rotors of the power generators are pushed via the water turbine, so that the rotors of the power generators speed up, and the power generators reach a full-power state;

3) at an ultrahigh wind speed, the water turbine rotates reversely to restrain the increasing of the speed of the rotors of the power generators, so that the rotors of the power generators return to a state at the rated rotation speed, and the power generated will not impact on the power grid; and 4) the energy-storing system and the power-generating system, cooperated with each other, can convert electrical power into energy in other forms for storage and then convert it back to electrical power, thereby solving the problem of electrical power waste to a certain extent and meanwhile solving the problem of off-grid power generation by a large vertical-axis wind generator.

DETAILED DESCRIPTION OF THE PREFERRED EMBODIMENTS

The present invention will be further described as below with reference to accompanying drawings.

Embodiment 1

An energy-storing and power-generating system for a vertical-axis wind generator includes an energy-storing system and a power-generating system.

Figure 1:
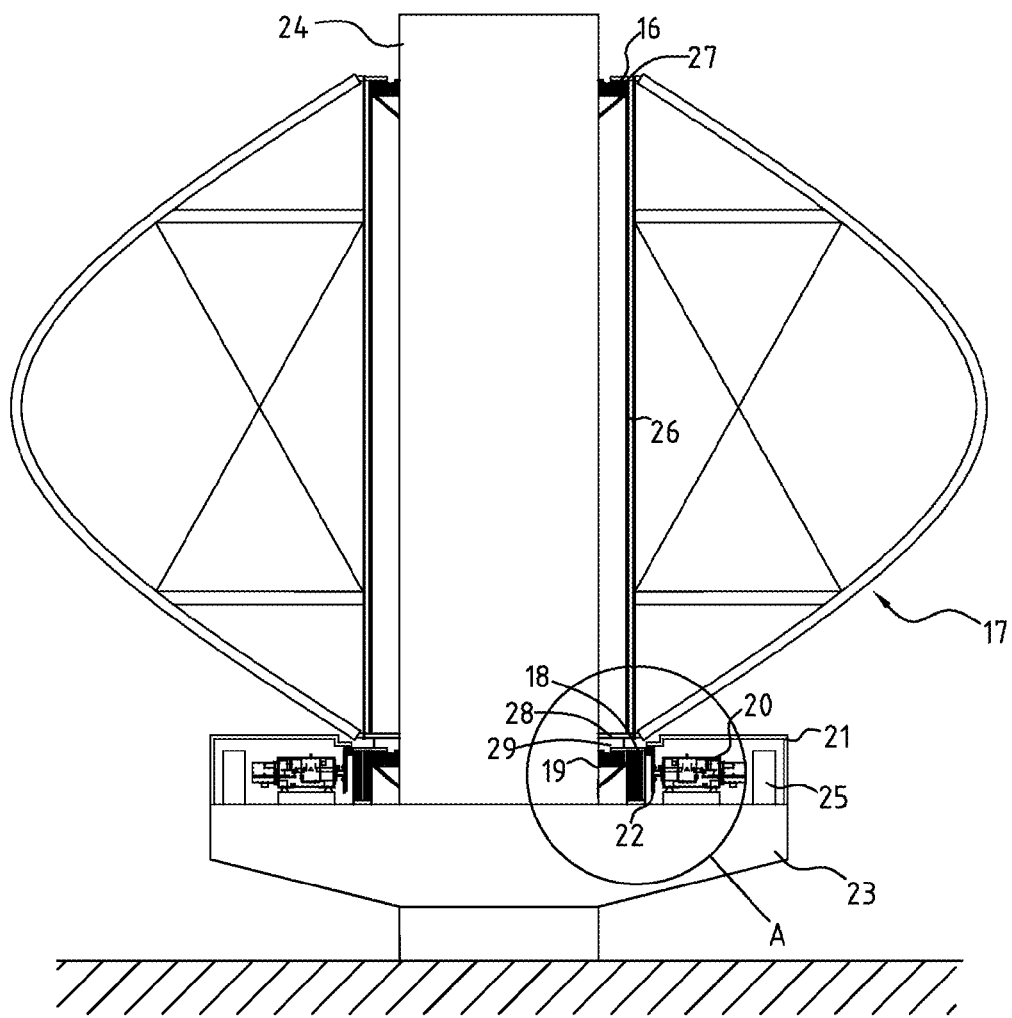
FIG. 1 is a structure diagram of a power-generating system according to Embodiment 1 of the present invention.
Figure 2:
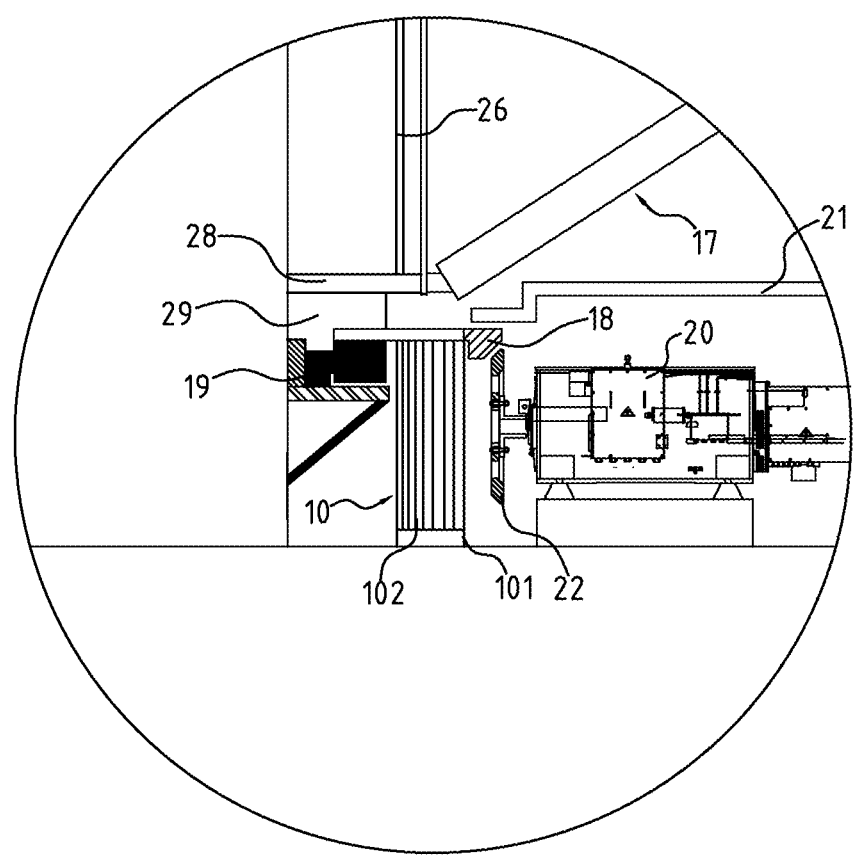
FIG. 2 is an enlarged view of A in FIG. 1.

As shown in FIG. 1 and FIG. 2, the energy-storing system includes a central pillar 24 and more than one power generation unit disposed on the central pillar 24. In this embodiment, one power generation unit is disposed on the central pillar 24, and the power generation unit is close to the ground. The power generation unit includes a wind wheel 17, main gears 18, more than two power generators 20 and an installation platform 23 for installing the power generators 20. In this embodiment, two power generators 20 are symmetrically provided on the periphery of the main gears 18; and, the wind wheel 17 is a φ-shaped wind wheel and consists of two symmetrical blades. A first bearing 16 is disposed at a position on the central pillar 24 corresponding to the upper end of the wind wheel 17, while a second bearing 19 is disposed at a position on the central pillar 24 corresponding to the lower end of the wind wheel 17. The upper end of each of the blades is connected to an outer ring of the first bearing 16 via a first connecting flange 27, while the lower end thereof is connected to an outer ring of the second bearing 19 via a second connecting flange 28, a coupler 29, a third connecting flange (not shown) and the main gear. The first and second bearings 16, 19 in this embodiment are double-row ball slewing bearings, and the bearings belong to the prior art and will not be described in details here, because those skilled in the art would have known the structure and working principle thereof. The wind wheel 17 is pivoted to the central pillar 24 via the first bearing 16 and the second bearing 19, and the wind wheel and the main gears 18 are at a synchronous speed.

The main gears 18 are connected to spindles of the power generators 20 via a set of gear transmission system, respectively. In this embodiment, the gear transmission system is a bevel gear 22. The main gears 18 are meshed with the bevel gear 22, and the bevel gear 22 is sheathed on the spindle of the power generator 20 that is placed horizontally. Therefore, the wind wheel 178 is coupled to the spindles of the power generators 20 via the main gears 18 and the bevel gear 22 in order to convert the vertical rotation of the wind wheel 17 into the horizontal rotation of the power generators 20, so that it is easier and more convenient for the vertical-axis wind generator to install the power generators 20.

Figure 6:
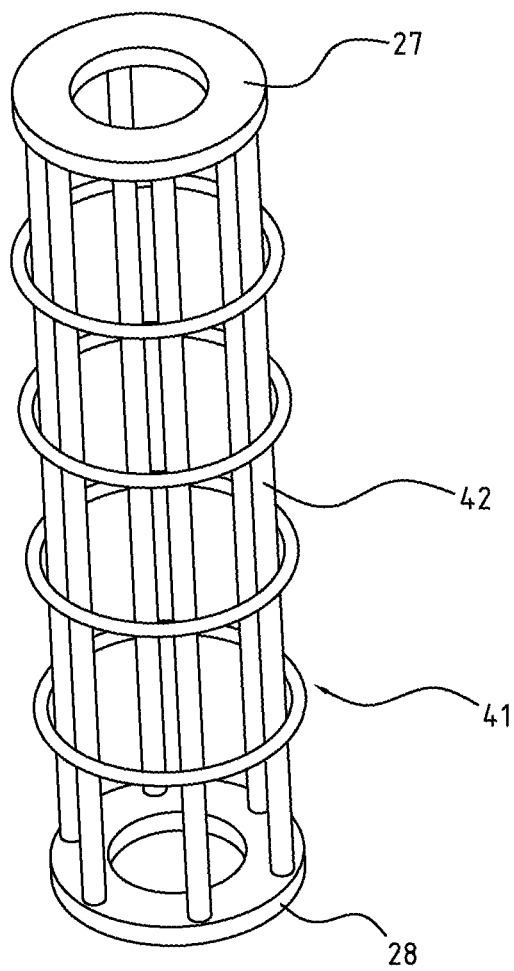
FIG. 6 is a structure diagram of a squirrel cage.

As shown in FIG. 6, more than two connecting pipes 26, uniformly distributed on a same circumference, are provided between the first bearing 16 and the second bearing 19. The upper end of each of the connecting pipes 26 is fixedly connected to the outer ring of the first bearing 26 via the first connecting flange 27, while the lower end thereof is connected to the second connecting flange 28. The outer ring of the first bearing 16 is synchronously coupled to the outer ring of the second bearing 19 via the connecting pipes 26. The distribution of the first connecting flanges 27, the connecting pipes 26 and the second connecting flanges 28 forms the structure of a squirrel cage 41. The wind speed at the upper ends of the blades is often different from that at the lower ends thereof, and the wind speed at the upper ends is usually greater than that at the lower ends, so the speed of the upper ends of the blades is quicker than that of the lower ends thereof during rotation. However, as the blades are of an integral structure, the upper ends and the lower ends of the blades must have a synchronous rotation speed. Thus, the blades are likely to be distorted, so that the optimal windward area of the blades is destroyed, and the utilization rate of wind energy for the blades is reduced. The design of the squirrel cage 41 is just for transferring the torque at the upper ends of the blades to the lower ends of the blades, so that the distortion of the blades may be reduced as much as possible during the rotation of the blades.

Clutches (not shown) for controlling the connection of the gear transmission system with the main gears 18 are provided between the main gears 18 and the bevel gear 22. Speed sensors (not shown) are provided on the wind wheel 17 and the spindles of the power generators 20. The speed sensors are electrically connected to the clutches. When detecting that the rotation speed of the wind wheel 17 or the spindles of the power generators 20 exceeds a preset value, the speed sensors send signals to the clutches, so that the clutches disconnect the gear transmission system from the main gears 18; and when detecting that the rotation speed of the wind wheel 17 returns to be within the preset value, the speed sensors send signals to the clutches, so that the clutches reconnect the gear transmission system to the main gears 18.

Figure 4:
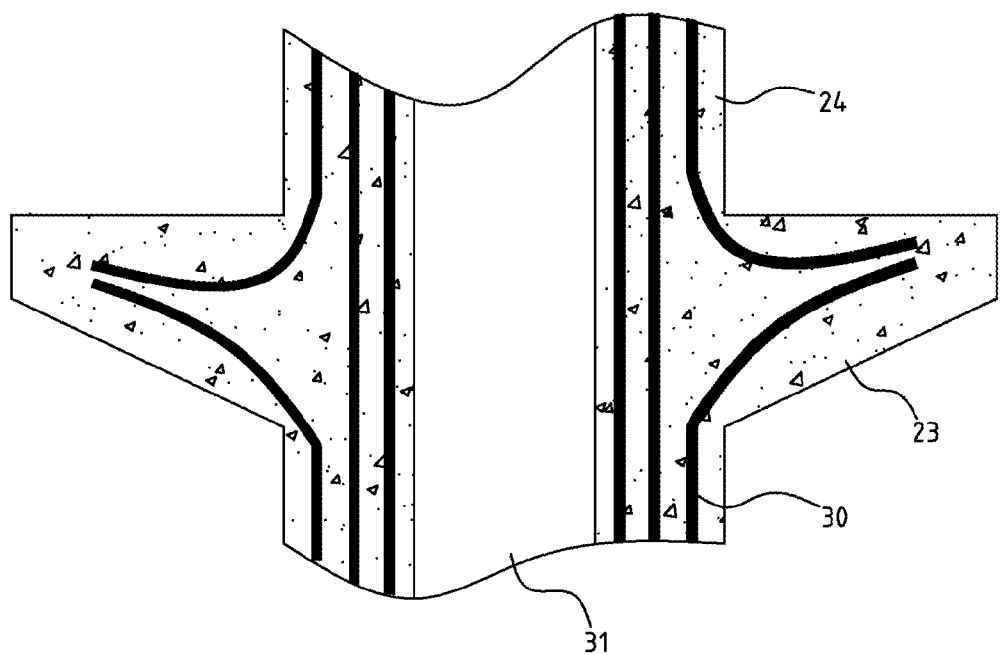
FIG. 4 is an internal structure diagram of an installation platform.

As shown in FIG. 4, the central pillar 24 is of a hollow reinforced concrete structure. The installation platform 23 surrounds the central pillar 24, and the installation platform 23 and the central pillar 24 are formed integrally by grouting. Joist steel is provided inside the installation platform 23. The joist steel is placed horizontally throughout the central pillar 24, and vertically crossed with each other to form a latticed distribution. Reinforcing steel bars 30 for construction within the central pillar 24 extend into the installation platform 23. Installation screw holes are provided on the installation platform 23. The power generators 20, a control cabinet 25 and other power generation equipment are fixed on the installation platform 23 via bolts. A shield 21 is provided on the installation platform 23, and surrounds the installation platform 23. A door and a window are provided on the shield 21 to form a weatherproof house. The power generators 20 are disposed within the house to protect the power generators 20, the control cabinet 25 and other power generation equipment from being influenced by the external environment and to ensure then to run in a safe environment, so that the service life of the power generation equipment can be increased. The distance between two adjacent installation platforms 23 is used for installing the wind wheel 17 of the power generation unit. For the convenience of maintenance, a passage 31 from a maintenance entrance to the inside of the central pillar 24 may be provided on the central pillar 24, so that maintenance personnel may enter the passage 31 of the central pillar 24 from the maintenance entrance. A suspension cage may be provided within the passage 31, so that the maintenance personnel may reach different height of the central pillar 24 via the suspension cage, and it is very convenient for a vertical-axis wind generator 20 with multiple layers of power generation units. In addition, cables of the upper layer of power generation unit may also be distributed via the passage 31.

Figure 5:
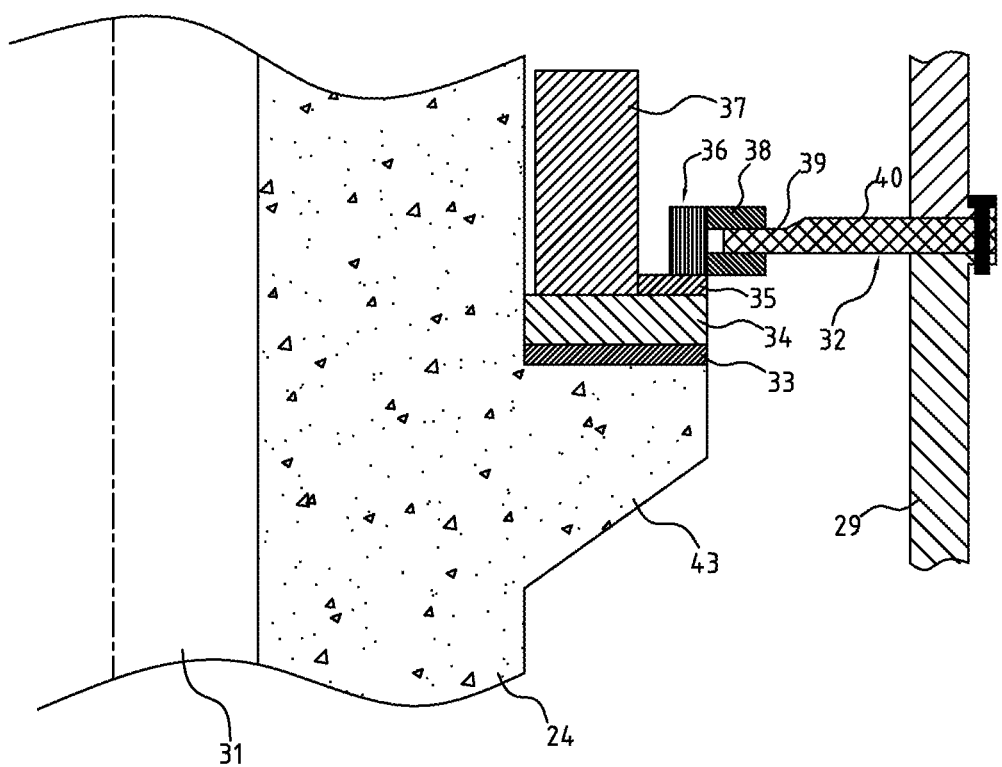
FIG. 5 is a structure diagram of a brake apparatus.

As shown in FIG. 5, the coupler 29 is an elastic coupler 29. The upper end of the coupler 29 is connected to the lower end of the wind wheel 17 via the second connecting flange 28 while the lower end thereof is connected to the main gears 18 via the third connecting flange, and the main gears 18 are fixed on the outer ring of the second bearing 19, so that the wind wheel 17, the coupler 29 and the main gears 18 can synchronize with each other. A brake apparatus is provided within the coupler 29. The brake apparatus includes an annular brake disc 32 and more than one braking device 36. The brake disc 32 includes a fixation portion 40 and a friction portion 29. A slop transition is provided between the fixation portion 40 and the friction portion 29. The fixation portion 40 is fixed on the coupler 29. Upper and lower surfaces of the friction portion 39 are provided thereon with antiskid stripes in a radius direction. The antiskid stripes are in a radial shape and increase the friction between brakes and the brake disc 32, so that the braking effect is enhanced. The braking device 36 includes a brake base plate 35, a damper 34, a damper base plate 33, brakes 38 and a power source 37 for driving the brakes. An annular boss 43 is extended from the central pillar 24. The damper base plate 33 is disposed on the boss 43, while the damper 34 is disposed on the damper base plate 33. The brake base plate 35 is disposed on the damper 34, and the brakes 38 are disposed on the brake base plate 35. The brakes 38 are uniformly distributed on the periphery of the central pillar 24 to realize multi-point braking. Each of the brakes 38 includes brake pads on two sides of the brake disc 32. The brake pads are in cooperation with the friction portion 39 of the brake disc 32. The power source 37 in the braking device 36 is a hydraulic driving system for providing reliable and strong power.

During braking, actually, the brake apparatus brakes the coupler 29. However, as the wind wheel 17 and the main gears 18 are connected together via the coupler 29, the speed of the wind wheel 17 and the main gears 18 of the vertical-axis wind generator 20 may be reduced, so that the wind wheel 17 is protected from being damaged due to stalling, and the power generators 20 are protected from being burned due to too high power generated. The brake apparatus is in cooperation with the vertical-axis wind generator 20, and has simple structure and prominent braking effect.

The wind wheel 17 rotates with wind. The power of the wind wheel 17 is transferred to the spindle of each of the power generators 20 via the main gears 18 and the gear transmission system, thus to provide mechanical energy to each of the power generators 20 for power generation. The ratio of the rotation speed of the main gears 18 to the spindles of the power generators 20 may be changed via the gear transmission system. Although the rotation speed of the wind wheel 17 is low, the wind wheel 17 still can output a large rotation speed to the spindles of the power generators 20 after adjusted by the gear transmission system, so that the high rotation speed power generators 20 may be utilized. Compared with the low rotation speed power generators 20 in the prior art, the high rotation speed power generators 20 are smaller in size under the same power generated. In the present invention, the load of the wind wheel is reduced, and the wind speed for activation is smaller, so that it is advantageous for the wind generator 20 to generate electricity at a low wind speed; each power generator 20 in the power generation unit is small in size, so the manufacturing cost is low, and the difficulty in maintenance and overhaul is reduced; and, more power generation units may be installed on the central pillar 24, so that the generated power of the energy-storing and power-generating system for the vertical-axis wind generator is further enhanced.

Figure 7:
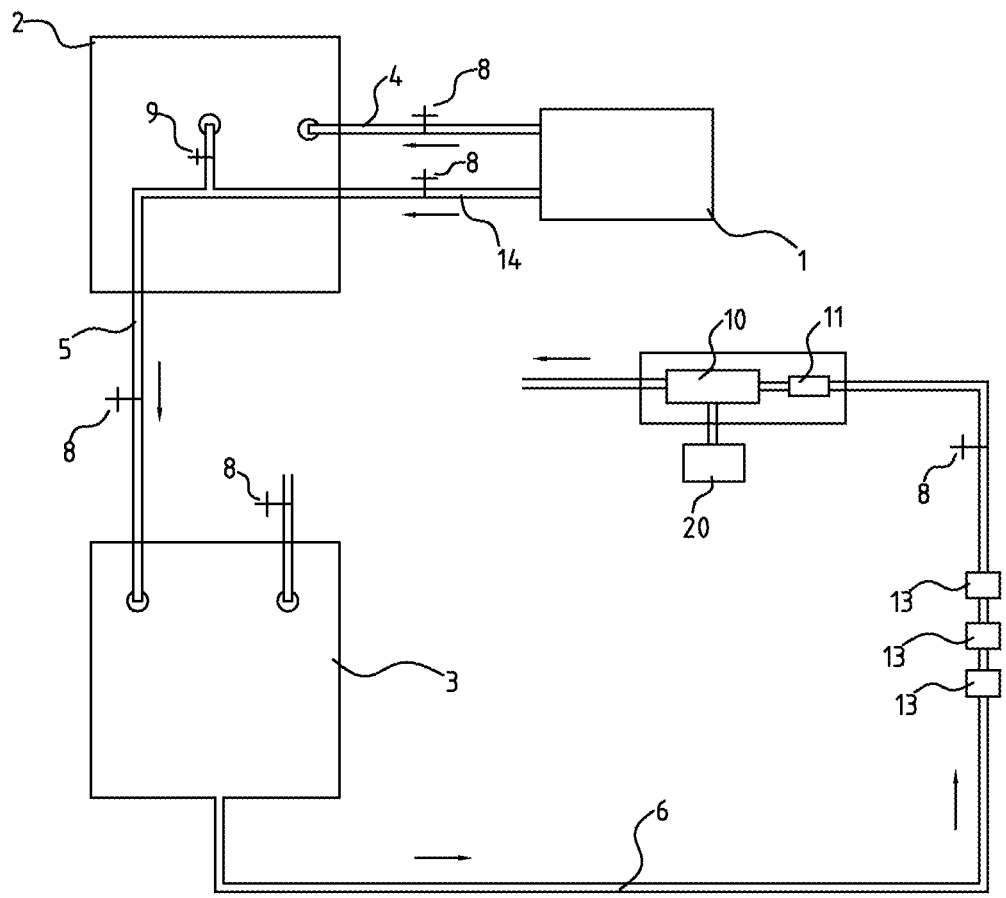
FIG. 7 is a piping diagram of an energy-storing system according to Embodiment 1 of the present invention.

As shown in FIG. 7, the energy-storing system includes a high pressure gas generator, a water storage apparatus and a water turbine. The high pressure gas generator includes at least one sealed high pressure gas tank 2 and an air compressor 1 cooperating therewith. In this embodiment, there are only one sealed high pressure gas tank 2 and one air compressor 1. The water storage apparatus includes at least one sealed water tank 3. In this embodiment, there is only one water tank 3. The air compressor 1 is in communication with the high pressure gas tank 2 via a gas inlet pipe 4 with a manual valve 8 provided thereon. The high pressure gas tank 2 is connected to a gas outlet pipe 5 via a regulating valve 9. The gas outlet pipe 5 is in communication with the top of the water tank 3 and provided thereon with a manual valve 8. The bottom of the water tank 3 is connected to a water inlet of the water turbine via a water outlet pipe 6 led from the bottom of the water tank 3. The water outlet pipe 6 is provided thereon with a manual valve 8 and at least one supercharger 13, and connected to the water inlet of the water turbine 10 via a pressurizing valve 11. The water turbine 10 is disposed below the power generation unit, and includes an impeller 102 surrounding the central pillar 24 and a shell 101 enclosing the impeller. The impeller 102 of the water turbine is connected to the main gears 18.

The energy-storing and power-generating principle of the vertical-axis wind generator provided by the present invention is as follows:

(1) the power-generating system conveys surplus electricity to the air compressor 1 of the energy-storing system via cables;

(2) the air compressor 1 is powered on and compresses air into the high pressure gas tank 2 via the gas inlet pipe 4 so that the conversion from electrical energy to the molecular potential energy of air is completed due to the increasing of the molecular potential energy of air in the high pressure gas tank 2;

(3) the water tank 3 is filled with water, the high pressure gas in the high pressure gas tank 2 is released into the water tank 5 via the gas outlet pipe 3 in order to increase the air pressure in the water tank 3 when it is required to activate the energy-storing system to generate electricity, water in the water tank 3 is drained to the water turbine 10 via the water outlet pipe 6 when the air pressure reaches a specified value, so that the water in the water outlet pipe 6 generates certain kinetic energy under the action of air pressure, and the conversion from the molecular potential energy of air to the kinetic energy of water is thus completed; and (4) the water having kinetic energy flows to the water turbine 10 along the water outlet pipe 6 and pushes the impeller 102 of the water turbine 10 to rotate, so that the conversion from the kinetic energy of water to mechanical energy is completed; and, the impeller 102 of the water turbine 10 drives the power generators 20 to rotate via the main gears 18, so that the power generation unit generates electricity, and the conversion from mechanical energy to electrical energy is completed finally.

For the power generation unit, the energy-storing unit may also play a role of adjusting the output power of the power generators 20.

The starting mode of the power generators 20 is as follows: when the power generators 20 are difficult to start at a lower wind speed, the energy-storing system is started to push the water turbine 10 to rotate, and the power generators 20 are started under the common action of the wind wheel 17 and the impeller 102 of the water turbine.

The power generation mode of the power generators 20 is as follows: in the case that the power generators 20 generate electricity normally but do not reach a full state, the speed sensors detect the rotation speed of the wind wheel 17 and return a signal to a controller, then the controller compares the signal with a preset signal and controls the flow of a solenoid valve on the water outlet pipe, and the water flow in the water outlet pipe is pressurized again by the supercharger 13 to form a strong water column and flows towards the impeller 102 of the water turbine, so that the rotation speed of the impeller 102 of the water turbine and the rotation speed of rotors of the power generators 20 are quickened; and, with the gradual increasing of the speed of the wind wheel 17, the flow of the solenoid valve is reduced gradually, so that the action of the water column in the water outlet pipe to the impeller 102 of the water turbine is weakened, and the rotators of the power generator 20 can reach a rated rotation speed stably. With the assistance of the energy-storing system, the power generation unit can remain at a full state all the time, so that the power generation unit is more stable when connected to a power grid.

The braking way of the power generators 20 is as follows: in the case that rotation speed of the power generators 20 exceeds a rated rotation speed at an ultrahigh wind speed, the speed sensors detect the rotation speed of the wind wheel 17 and return a signal to the controller, and then the controller compares the signal with the preset signal and controls the flow of the solenoid valve and the direction of the water inlet of the water turbine. The water column in the water outlet pipe 6 acts on the impeller 102 in a direction opposite to the rotation direction of the impeller 102, and applies a reverse push force to the impeller 102, so that the maximum of the speed of the rotors of the power generators 20 is limited, and the power generation state of the power generation unit remains at a full state.

Embodiment 2

An energy-storing and power-generating system for a vertical-axis wind generator includes an energy-storing system and a power-generating system.

Figure 3:
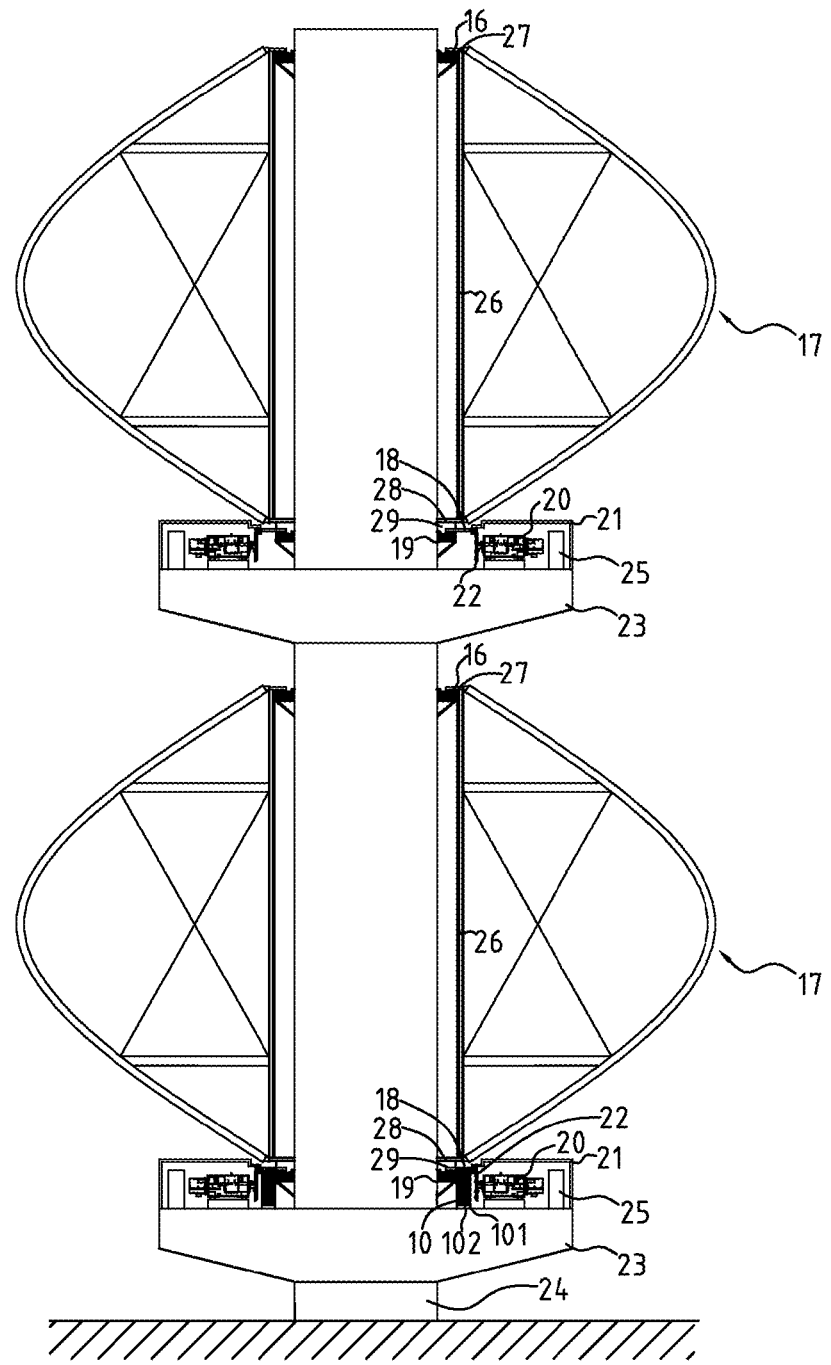
FIG. 3 is a structure diagram of a power-generating system according to Embodiment 2 of the present invention.

As shown in FIG. 3, the energy-storing system includes a central pillar 24 and more than one power generation unit disposed on the central pillar 24. In this embodiment, two power generation units are disposed on the central pillar 24. Each power generation unit includes a wind wheel 17, main gears 18, more than two power generators 20 and an installation platform 23 for installing the power generators 20. In this embodiment, two power generators 20 are symmetrically provided on the periphery of the main gears 18; and, the wind wheels 17 are a φ-shaped wind wheel and consist of two symmetrical blades. A first bearing 16 is disposed at a position on the central pillar 24 corresponding to the upper ends of the wind wheels 17, while a second bearing 19 is disposed at a position on the central pillar 24 corresponding to the lower ends of the wind wheels 17. The upper end of each of the blades is connected to an outer ring of the first bearing 16 via a first connecting flange 27, while the lower end thereof is connected to an outer ring of the second bearing 19 via a second connecting flange 28, a coupler 29, a third connecting flange (not shown) and the main gear. The first and second bearings 16, 19 in this embodiment are double-row ball slewing bearings, and the bearings belongs to the prior art and will not be described in details here, because those skilled in the art would have known the structure and working principle thereof. The wind wheels 17 are pivoted to the central pillar 24 via the first bearing 16 and the second bearing 19, and the wind wheels 17 and the main gears 18 are at a synchronous speed.

The main gears 18 are connected to spindles of the power generators 20 via a set of gear transmission system, respectively. In this embodiment, the gear transmission system is a bevel gear 22. The main gears 18 are meshed with the bevel gear 22, and the bevel gear 22 is sheathed on the spindle of the power generator 20 that is placed horizontally. Therefore, the wind wheel 178 is coupled to the spindles of the power generators 20 via the main gears 18 and the bevel gear 22 in order to convert the vertical rotation of the wind wheels 17 into the horizontal rotation of the power generators 20, so that it is easier and more convenient for the vertical-axis wind generator to install the power generators 20.

As shown in FIG. 6, more than two connecting pipes 26, uniformly distributed on a same circumference, are provided between the first bearing 16 and the second bearing 19. The upper end of each of the connecting pipe 26 is fixedly connected to the outer ring of the first bearing 26 via the first connecting flange 27, while the lower end thereof is connected to the second connecting flange 28. The outer ring of the first bearing 16 is synchronously coupled to the outer ring of the second bearing 19 via the connecting pipes 26. The distribution of the first connecting flanges 27, the connecting pipes 26 and the second connecting flanges 28 forms the structure of a squirrel cage 41. The wind speed at the upper ends of the blades is often different from that at the lower ends thereof, and the wind speed at the upper ends is usually greater than that at the lower ends, so the speed of the upper ends of the blades is quicker than that of the lower ends thereof during rotation. However, as the blades are of an integral structure, the upper ends and the lower ends of the blades must have a synchronous rotation speed. Thus, the blades are likely to be distorted, so that the optimal windward area of the blades is destroyed, and the utilization rate of wind energy for the blades is reduced. The design of the squirrel cage 41 is just for transferring the torque at the upper ends of the blades to the lower ends of the blades, so that the distortion of the blades may be reduced as much as possible during the rotation of the blades.

Clutches (not shown) for controlling the connection of the gear transmission system with the main gears 18 are provided between the main gears 18 and the bevel gear 22. Speed sensors (not shown) are provided on the wind wheels 17 and the spindles of the power generators 20. The speed sensors are electrically connected to the clutches. When detecting that the rotation speed of the wind wheels 17 or the spindles of the power generators 20 exceeds a preset value, the speed sensors send signals to the clutches, so that the clutches disconnect the gear transmission system from the main gears 18; and when detecting that the rotation speed of the wind wheels 17 return to be within the preset value, the speed sensors send signals to the clutches, so that the clutches reconnect the gear transmission system to the main gears 18.

As shown in FIG. 4, the central pillar 24 is of a hollow reinforced concrete structure. The installation platforms 23 surround the central pillar 24, and the installation platforms 23 and the central pillar 24 are formed integrally by grouting. Joist steel is provided inside the installation platforms 23. The joist steel is placed horizontally throughout the central pillar 24, and vertically crossed with each other to form a latticed distribution. Reinforcing steel bars 30 for construction within the central pillar 24 extend into the installation platforms 23. Installation screw holes are provided on the installation platforms 23. The power generators 20, a control cabinet 25 and other power generation equipment are fixed on the installation platforms 23 via bolts. A shield 21 is provided on the installation platforms 23, and surrounds the installation platforms 23. A door and a window are provided on the shield 21 to form a weatherproof house. The power generators 20 are disposed within the house to protect the power generators 20, the control cabinet 25 and other power generation equipment from being influenced by the external environment and to ensure then to run in a safe environment, so that the service life of the power generation equipment can be increased. The distance between two adjacent installation platforms 23 is used for installing the wind wheels 17 of the power generation units. For the convenience of maintenance, a passage 31 from a maintenance entrance to the inside of the central pillar 24 may be provided on the central pillar 24, so that maintenance personnel may enter the passage 31 of the central pillar 24 from the maintenance entrance. A suspension cage may be provided within the passage 31, so that the maintenance personnel may reach different height of the central pillar 24 via the suspension cage, and it is very convenient for a vertical-axis wind generator 20 with multiple layers of power generation units. In addition, cables of the upper layer of power generation unit may also be distributed via the passage 31.

As shown in FIG. 5, the coupler 29 is an elastic coupler 29. The upper end of the coupler 29 is connected to the lower end of each of the wind wheels 17 via the second connecting flange 28 while the lower end thereof is connected to the main gears 18 via the third connecting flange, and the main gears 18 are fixed on the outer ring of the second bearing 19, so that the wind wheels 17, the coupler 29 and the main gears 18 can synchronize with each other. A brake apparatus is provided within the coupler 29. The brake apparatus includes an annular brake disc 32 and more than one braking device 36. The brake disc 32 includes a fixation portion 40 and a friction portion 29. A slop transition is provided between the fixation portion 40 and the friction portion 29. The fixation portion 40 is fixed on the coupler 29. Upper and lower surfaces of the friction portion 39 are provided thereon with antiskid stripes in a radius direction. The antiskid stripes are in a radial shape and increase the friction between brakes and the brake disc 32, so that the braking effect is enhanced. The braking device 36 includes a brake base plate 35, a damper 34, a damper base plate 33, brakes 38 and a power source 37 for driving the brakes. An annular boss 43 is extended from the central pillar 24. The damper base plate 33 is disposed on the boss 43, while the damper 34 is disposed on the damper base plate 33. The brake base plate 35 is disposed on the damper 34, and the brakes 38 are disposed on the brake base plate 35. The brakes 38 are uniformly distributed on the periphery of the central pillar 24 to realize multi-point braking. Each of the brakes 38 includes brake pads on two sides of the brake disc 32. The brake pads are in cooperation with the friction portion 39 of the brake disc 32. The power source 37 in the braking device 36 is a hydraulic driving system for providing reliable and strong power.

During braking, actually, the brake apparatus brakes the coupler 29. However, as the wind wheels 17 and the main gears 18 are connected together via the coupler 29, the speed of the wind wheels 17 and the main gears 18 of the vertical-axis wind generator 20 may be reduced, so that the wind wheels 17 is protected from being damaged due to stalling, and the power generator 20 are protected from being burned due to too high power generated. The brake apparatus is in cooperation with the vertical-axis wind generator 20, and has simple structure and prominent braking effect.

The wind wheels 17 rotate with wind. The power of the wind wheels 17 is transferred to the spindle of each of the power generators 20 via the main gears 18 and the gear transmission system, thus to provide mechanical energy to each of the power generators 20 for power generation. The ratio of the rotation speed of the main gears 18 to the spindles of the power generators 20 may be changed via the gear transmission system. Although the rotation speed of the wind wheels 17 is low, the wind wheels 17 still can output a large rotation speed to the spindles of the power generators 20 after adjusted by the gear transmission system, so that the high rotation speed power generators 20 may be utilized. Compared with the low rotation speed power generators 20 in the prior art, the high rotation speed power generators 20 are smaller in size under the same generated power. In the present invention, the load of the wind wheel is reduced, and the wind speed for activation is smaller, so that it is advantageous for the wind generator 20 to generate electricity at a low wind speed; each power generator 20 in the power generation unit is small in size, so the manufacturing cost is low, and the difficulty in maintenance and overhaul is reduced; and, more power generation units may be installed on the central pillar 24, so that the generated power of the energy-storing and power-generating system for the vertical-axis wind generator is further enhanced.

Figure 8:
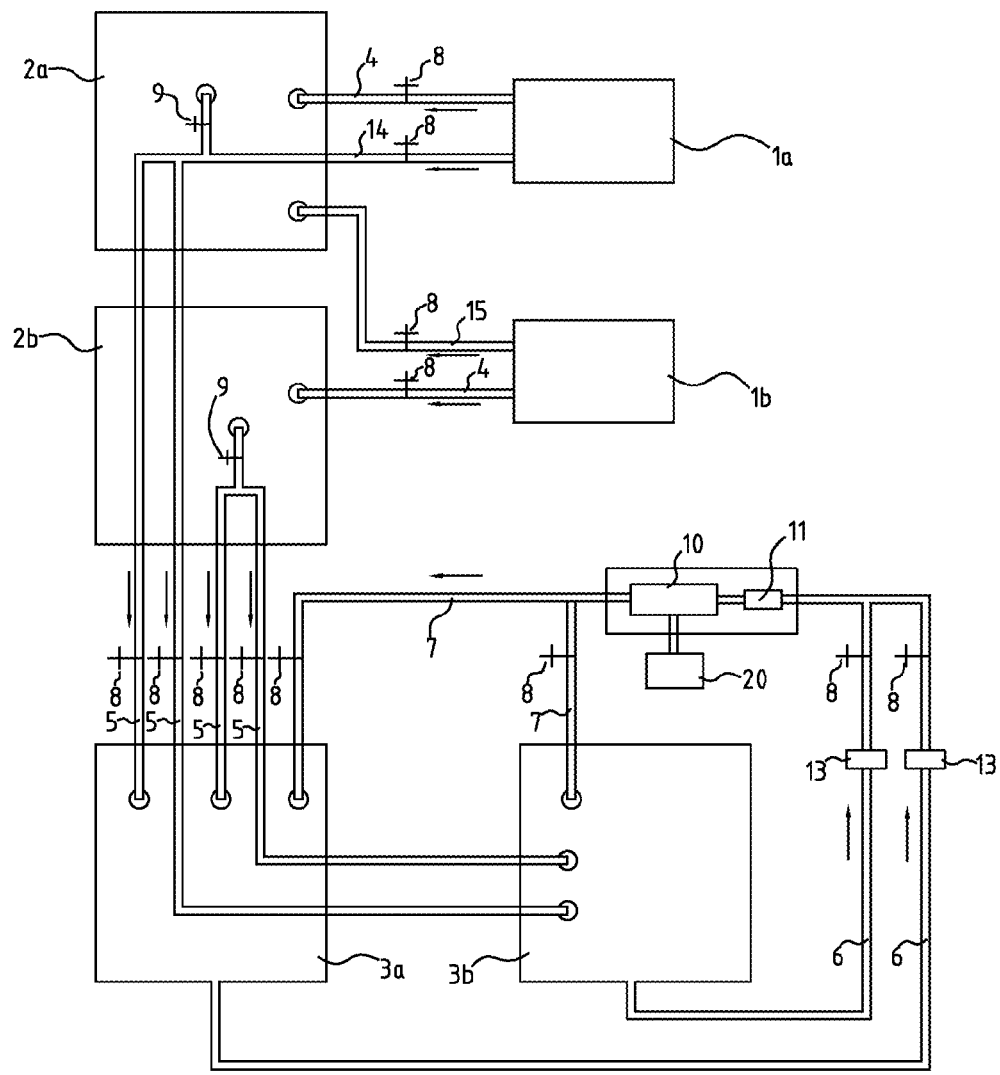
FIG. 8 is a piping diagram of an energy-storing system according to Embodiment 2 of the present invention.
Figure 9:
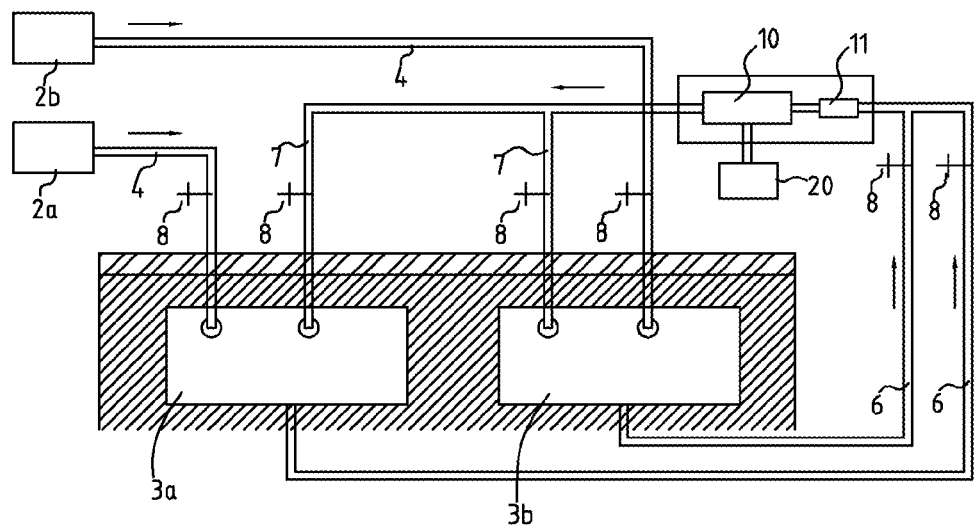
FIG. 9 is a cutaway view of a water tank in the energy-storing system according to Embodiment 2 of the present invention.

As shown in FIG. 8 and FIG. 9, the energy-storing system includes a high pressure gas generator, a water storage apparatus and a water turbine 10. The high pressure gas generator includes two sealed high pressure gas tanks and two air compressor. The two high pressure gas tanks are a first high pressure gas tank 2a and a second high pressure gas tank 2b, respectively. The two air compressors are a first air compressor 1a and a second air compressor 1b, respectively. The water storage apparatus includes two water tanks, i.e., a first water tank 3a and a second water tank 3b. The first air compressor 1a is in communication with the first high pressure gas tank 2a via a gas inlet pipe 4 with a manual valve 8 provided thereon. The second air compressor 1b is in communication with the second high pressure gas tank 2b via a gas inlet pipe 4 with a manual valve 8 provided thereon. The second air compressor 1b is in communication with the first high pressure gas tank 2a via a first gas pipe 15 with a manual valve 8 provided thereon. The first high pressure gas tank 2a is connected two gas outlet pipes 5 via a regulating valve 9. The gas outlet pipes 5 are in communication with the tops of the first water tank 3a and the second water tank 3b, respectively, and are provided thereon with manual valves 8. The first air compressor 1a is in communication with the gas outlet pipes 5 via a second gas pipe 14 with a manual valve 8 provided thereon. The second high pressure gas tank 2b are connected to the two gas outlet pipes 5 via a regulating valve 9. The gas outlet pipes 5 are provided thereon with manual valves 8. Water outlet pipes 6, led from the bottoms of the first water tank 3a and the second water tank 3b, are connected to a water inlet of the water turbine 10 via pressurizing valves 11 and provided thereon with manual valves 8 and superchargers 13. The water turbine 10 is disposed below the power generation unit close to the ground, and includes an impeller 102 surrounding the central pillar 24 and a shell 101 enclosing the impeller. The impeller 102 of the water turbine is connected to the main gears 18. The water outlet of the water turbine 10 is in communication with the tops of the first water tank 3a and the second water tank 3b via water return pipes 7 having manual valves 8 provided thereon, respectively.

The energy-storing and power-generating principle of the vertical-axis wind generator provided by the present invention is as follows:

(1) the power-generating system conveys surplus electricity to the first air compressor 1a and the second air compressor 1b of the energy-storing system via cables;

(2) the first air compressor 1a and the second air compressor 1b are powered on, the first air compressor 1a compresses air into the first high pressure gas tank 2a via the gas inlet pipe 4 so that the molecular potential energy of air in the first high pressure gas tank 2a increases; the second air compressor 1b compresses air into the second high pressure gas tank 2b so that the molecular potential energy of air in the second high pressure gas tank 2b increase, and the conversion from electrical energy to the molecular potential energy of air is completed; and if necessary, the second air compressor 1b compresses air into the first high pressure gas tank 2a via the first gas pipe 15 in order to quicken the gas storage speed of the first high pressure gas tank 2a;

(3) the first water tank 3a or the second water tank 3b is filled with water, where the water tank filled with water is a working water tank while the water tank without water is a spare water tank, the high pressure gas in the first high pressure gas tank 2a and/or the second high pressure gas tank 2b is released into the working water tank via the gas outlet pipes 5 in order to increase the air pressure in the working water tank when it is required to activate the energy-storing system to generate power, water in the working water tank is drained to the water turbine 10 via the water outlet pipe 6 when the air pressure reaches a designated value, so that water in the water outlet pipe 6 generates certain kinetic energy under the action of air pressure, and the conversion from the molecular potential energy of air to the kinetic energy of water is thus completed; and, when the power station still have surplus electrical energy or air pressure in the first high pressure gas tank 2a and the second high pressure gas tank 2b cannot reach a working state during the activation of the energy-storing and power-generating system, the first air compressor 1a directly feed high pressure gas into the working water tank via the second gas pipe 14 and the gas outlet pipes 5;

(4) the water having kinetic energy flows to the water turbine 10 along the water outlet pipe 6 and pushes the impeller 102 of the water turbine 10 to rotate, so that the conversion from the kinetic energy of water to mechanical energy is completed; and, the impeller 102 of the water turbine 10 drives the power generators 20 to rotate via the gear transmission system, so that the power generation units generate electricity, and the conversion from mechanical energy to electrical energy is completed finally;

(5) the water having kinetic energy enters the spare water tank via the water return pipe after acting on the water turbine 10, until the water in the working water tank is all transferred into the spare water tank, and then the spare water tank becomes a new working water tank while the original working tank becomes a new spare water tank; and (6) the high pressure gas in the first high pressure gas tank 2a and/or the second high pressure gas tank 2b is released into the new working water tank via the gas outlet pipes 5, and Steps (2)-(4) are performed in such a cycle until the high pressure gas in the first high pressure gas tank 2a and the second high pressure gas tank 2b is all released.

For the power generation unit close to the ground, the energy-storing unit may also play a role of adjusting the output power of the power generators 20.

The starting mode of the power generators 20 is as follows: when the power generators 20 are difficult to start at a lower wind speed, the energy-storing system is started to push the water turbine 10 to rotate, and the power generators 20 are started under the common action of the wind wheel 17 and the impeller 102 of the water turbine 10.

The power generation mode of the power generators 20 is as follows: in the case that the power generators 20 generate electricity normally but do not reach a full state, the speed sensors detect the rotation speed of the wind wheels 17 and return a signal to a controller, then the controller compares the signal with a preset signal and controls the flow of a solenoid valve on the water outlet pipe 6, and the water flow in the water outlet pipe 6 is pressurized again by the superchargers 13 to form a strong water column and flows towards the impeller 102 of the water turbine 10, so that the rotation speed of the impeller 102 of the water turbine and the rotation speed of rotors of the power generators 20 are quickened; and, with the gradual increasing of the speed of the wind wheels 17, the flow of the solenoid valve is reduced gradually, so that the action of the water column in the water outlet pipe to the impeller 102 of the water turbine 10 is weakened, and the rotators of the power generator 20 can reach a rated rotation speed stably. With the assistance of the energy-storing system, the bottom power generation unit can remain at a full state all the time, so that the power generation unit is more stable when connected to a power grid.

The braking way of the power generators 20 is as follows: in the case that rotation speed of the power generators 20 exceeds a rated rotation speed at an ultrahigh wind speed, the speed sensors detect the rotation speed of the wind wheels 17 and return a signal to the controller, and then the controller compares the signal with the preset signal and controls the flow of the solenoid valve and the direction of the water inlet of the water turbine 10. The water column in the water outlet pipe 6 acts on the impeller 102 in a direction opposite to the rotation direction of the impeller 102, and applies a reverse push force to the impeller 102, so that the maximum of the speed of the rotors of the power generators 20 is limited, and the power generation state of the bottom power generation unit remains at a full state.

Embodiment 3

Figure 10:
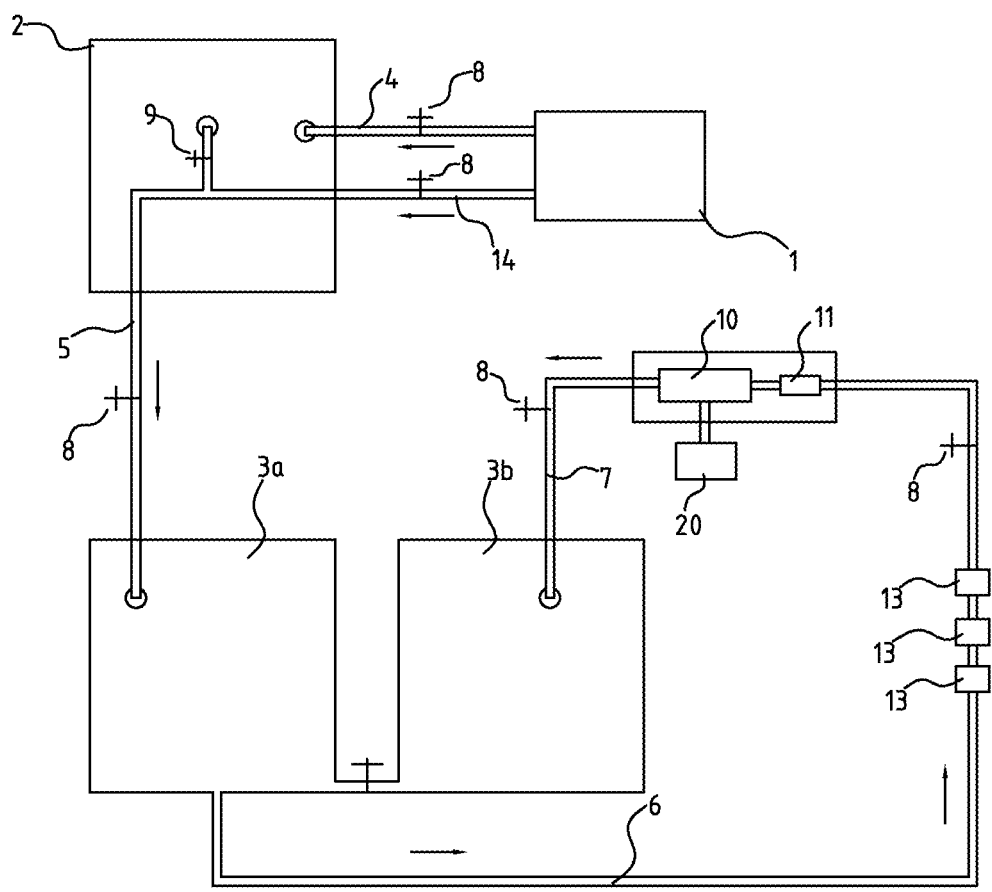
FIG. 10 is a piping diagram of an energy-storing system according to Embodiment 3.

As shown in FIG. 10, this embodiment is different from Embodiment 1 in that: the high pressure gas generators of the energy-storing system includes only one sealed high pressure gas tank 2 and one air compressor 1; and, the water storage apparatus includes two water tanks communicated with each other, i.e., a first water tank 3a and a second water tank 3b, between which a valve (not shown) is provided to control the communication thereof. The air compressor 1 is in communication with the high pressure gas tank 2 via a gas inlet pipe 4 with a manual valve 8 provided thereon. The high pressure gas tank 2 is connected to a gas outlet pipe 5 via a regulating valve 9. The gas outlet pipe 5 is in communicated with the top of the first water tank 3a and provided thereon with a manual valve 8. The air compressor 1 is in communication with the gas outlet pipe 5 via a second gas 14 with a manual valve 8 provided thereon. The bottom of the first water tank 3a is connected to the water inlet of the water turbine 10 via a water outlet pipe 6 that is led from the bottom of the first water tank 3a and provided with a manual valve 8 and at least one supercharger 13. The water outlet pipe 6 is connected to the water inlet of the water turbine 10 via a pressurizing valve 10. The water outlet of the water turbine is in communication with the second water tank 3b via a water return pipe 7.

The energy-storing and power-generating principle of the vertical-axis wind generator provided by the present invention is as follows:

(1) the power-generating system conveys surplus electricity to the air compressor 1 of the energy-storing system via cables;

(2) the air compressor 1 is powered, the air compressor 1 compresses air into the high pressure gas tank 2 via the gas inlet pipe 4 so that the molecular potential energy of air in the high pressure gas tank 2 increases;

(3) the first water tank 3a is filled with water, the high pressure gas in the high pressure gas tank 2 is released into the first water tank 3a via the gas outlet pipe 5 in order to increase the air pressure in the first water tank 3a when it is required to activate the energy-storing system to generate power, water in the first water tank 3a is drained to the water turbine 10 via the water outlet pipe 6 when the air pressure reaches a designated value, so that water in the water outlet pipe 6 generates certain kinetic energy under the action of air pressure, and the conversion from the molecular potential energy of air to the kinetic energy of water is thus completed; and, when the power station still have surplus electrical energy or air pressure in the high pressure gas tank 2 cannot reach a working state during the activation of the energy-storing and power-generating system, the air compressor 1 directly feed high pressure gas into the first water tank 3a via the second gas pipe 14 and the gas outlet pipe 5;

(4) the water having kinetic energy flows to the water turbine 10 along the water outlet pipe 6 and pushes the impeller 101 of the water turbine 10 to rotate, so that the conversion from the kinetic energy of water to mechanical energy is completed; and, the impeller 101 of the water turbine 10 drives the rotors of external-rotor power generators 12 to rotate, so that the bottom power generation unit generate electricity, and the conversion from mechanical energy to electrical energy is completed finally;

(5) the water having kinetic energy enters the second water tank 3b via the water return pipe 7 after acting on the water turbine 10, until the water in the second water tank 3b is all transferred into the spare water tank; then, the high pressure gas in the first water tank 3a is released and water in the second water tank 3b flows back to the first water tank 3a; and (6) the high pressure gas in the high pressure gas tank 2 is released into the new first water tank again via the gas outlet pipe 5, and Steps (2)-(4) are performed in such a cycle until the high pressure gas in the high pressure gas tank 2 is all released.

In conclusion, when the energy-storing and power-generating system for a vertical-axis wind generator provided by the present invention is connected to a power grid, the power generated will not impact on the power grid, and the power generated will not impact on the power grid when the generator is connected to a power grid, and electrical power can be converted into energy in other forms for storage and then energy in other forms can be converted back to electrical power, thereby solving the problem of electrical power waste to a certain extent and meanwhile solving the problem of a large vertical-axis wind generator in off-grid power generation.

What is claimed is:

1. An energy-storing and power-generating system for a vertical-axis wind generator, comprising:
an energy-storing system and a power-generating system, wherein the power-generating system comprises:
a central pillar and at least two power generation units disposed on the central pillar, the power generation units comprising a Φ (phi-shaped wind wheel pivoted to the central pillar, main gears sheathed on the central pillar, at least two power generators and an installation platform for installing the at least two power generators, the main gears being disposed below the wind wheel and connected to the wind wheel, the main gears being coupled to corresponding spindles of each of the at least two power generators via a set of gear transmission system, respectively;
the energy-storing system comprises:
a high pressure gas generator, a water storage apparatus and a water turbine, the high pressure gas generator comprising at least one high pressure gas tank and an air compressor, such that, the air compressor being in communication with the high pressure gas tank via a gas inlet pipe,
the water storage apparatus comprising at least one water tank, the high pressure gas tank being in communication with the water tank via a gas outlet pipe, the water turbine being disposed below the power generation unit close to the ground, the water turbine comprising an impeller surrounding the central pillar and a shell enclosing the impeller, a water inlet and a water outlet being provided on the shell, the water tank being connected to the water inlet of the water turbine via a water outlet pipe, the impeller of the water turbine being connected to the main gear of the power generation unit close to the ground; and, the power-generating system supplies power to the air compressor via cables.

2. The energy-storing and power-generating system for a vertical-axis wind generator according to claim 1, wherein a first bearing is provided at the upper end of the wind wheel, an inner ring of the first bearing being fixedly sheathed on the central pillar while an outer ring being fixedly connected to the upper end of the wind wheel; and, a second bearing is provided at the lower end of the wind wheel, an inner ring of the second bearing being fixedly sheathed on the central pillar while an outer ring being fixedly connected to the lower end of the wind wheel and the main gears, the wind wheel being pivoted to the central pillar via the first bearing and the second bearing.

3. The energy-storing and power-generating system for a vertical-axis wind generator according to claim 1, wherein a coupler and a brake apparatus are provided between the main gears and the wind wheel, the upper end of the coupler being connected to the lower end of the wind wheel while the lower end being connected to the main gears, the brake apparatus comprising an annular brake disc disposed on the coupler and at least one braking device fixed on the central pillar, the at least one braking device comprising brakes and a power source for driving the brakes, the brakes being in cooperation with the brake disc.

4. The energy-storing and power-generating system for a vertical-axis wind generator according to claim 1, wherein the central pillar is of a reinforced concrete structure, the center of the central pillar being provided with a through passage from bottom to top of the central pillar, the installation platform surrounding the central pillar, the installation platform and the central pillar being formed integrally by grouting, installation screw holes being provided on the installation platform, corresponding inner-rotor of each of the at least two power generators being fixed on the installation platform via bolts.

5. The energy-storing and power-generating system for a vertical-axis wind generator according to claim 1, wherein the water storage apparatus comprises two water tanks, a water outlet of the water turbine being in communication with said water tanks via a water return pipe.

6. The energy-storing and power-generating system for a vertical-axis wind generator according to claim 1, wherein the high pressure gas generator comprises two high pressure gas tanks and two air compressors, the two high pressure gas tanks being a first high pressure gas tank and a second high pressure gas tank, respectively, the two air compressors being a first air compressor and a second air compressor, respectively, the second air compressor being in communication with the first high pressure gas tank via a first gas pipe, the first air compressor being in communication with the gas outlet pipe via a second gas pipe.

7. The energy-storing and power-generating system for a vertical-axis wind generator according to claim 5, wherein the high pressure gas generator comprises two high pressure gas tanks and two air compressors, the two high pressure gas tanks being a first high pressure gas tank and a second high pressure gas tank, respectively, the two air compressors being a first air compressor and a second air compressor, respectively, the second air compressor being in communication with the first high pressure gas tank via a first gas pipe, the first air compressor being in communication with the gas outlet pipe via a second gas pipe.

8. The energy-storing and power-generating system for a vertical-axis wind generator according to claim 7, wherein the gas inlet pipe, the gas outlet pipe, the first gas pipe, the second gas pipe, the water outlet pipe and the water return pipe are all provided thereon with valves; and pressurizing equipment is provided on the water outlet pipe.

9. The energy-storing and power-generating system for a vertical-axis wind generator according to claim 6, wherein the gas inlet pipe, the gas outlet pipe, the first gas pipe, the second gas pipe, the water outlet pipe and the water return pipe are all provided thereon with valves; and pressurizing equipment is provided on the water outlet pipe.

10. An energy-storing and power-generating method for a vertical-axis wind generator, having an energy-storing system and a power-generating system;
the power-generating system comprising:
at least two power generation units disposed on a central pillar, the power generation units comprising a Φ(phi)-shaped wind wheel pivoted to the central pillar, main gears sheathed on the central pillar, at least two power generators and an installation platform for installing the at least two power generators, the energy-storing system comprising a high pressure gas generator, a water storage apparatus and a water turbine, the high pressure gas generator comprising at least one high pressure gas tank and an air compressor, such that, the air compressor being in communication with the high pressure gas tank via a gas inlet pipe, and the water storage apparatus comprising at least one water tank;
the power-generating method comprises the following steps:
(1) the power-generating system conveys surplus electricity to the air compressor of the energy-storing system via cables;
(2) the air compressor is powered by the surplus electrical energy which compresses air and delivers the compressed air into the high pressure gas tank via the gas inlet pipe to convert the surplus electrical energy to molecular potential energy of the compressed air due to increase in the molecular potential energy of the compressed air in the high pressure gas tank;
(3) the water tank is filled with water, the high pressure gas in the high pressure gas tank is released into the water tank via the gas outlet pipe to increase the air pressure in the water tank thereby activating the energy-storing system, water in the water tank is drained to the water turbine via a water outlet pipe when the air pressure reaches a specified value, so that the water in the water outlet pipe generates kinetic energy under action of the air pressure, and to convert the molecular potential energy of the compressed air to the kinetic energy of the water; and
(4) the water having the kinetic energy flows to the water turbine along the water outlet pipe and pushes impeller of the water turbine to rotate, to covert the kinetic energy of the water to mechanical energy; and, the impeller of the water turbine drives the main gear of the power generation unit close to the ground to rotate, and the main gear transfers power to the at least two power generators via a gear transmission system, to convert mechanical energy to electrical energy.

11. The energy-storing and power-generating method for a vertical-axis wind generator according to claim 10, wherein the high pressure gas generator comprises two high pressure gas tanks and two air compressors, the two high pressure gas tanks being a first high pressure gas tank and a second high pressure gas tank, respectively, the two air compressors being a first air compressor and a second air compressor, respectively, the second air compressor being in communication with the first high pressure gas tank via a first gas pipe, the first air compressor being in communication with the gas outlet pipe via a second gas pipe; the method further comprises:

the first air compressor compresses air, and delivers the compressed air into the first high pressure gas tank via a gas inlet pipe to increase the molecular potential energy of the compressed air in the first high pressure gas tank, and the second air compressor compresses air, and delivers the compressed air into the second high pressure gas tank via a gas inlet pipe to increase the molecular potential energy of the compressed air in the second high pressure gas tank.

12. The energy-storing and power-generating method for a vertical-axis wind generator according to claim 10, wherein the water storage apparatus comprises two water tanks, the water outlet of the water turbine being in communication with the water tanks via water return pipes; the method further comprises:

the first water tank or the second water is filled with water, so that the water tank filled with the water is a working water tank while the water tank without the water is a spare water tank, the high pressure gas in the high pressure gas tanks is released into the working water tank via gas outlet pipes to increase the air pressure in the working water tank to activate the energy-storing system to generate power, the water in the working water tank is drained to the water turbine via the water outlet pipe when the air pressure reaches a designated value, water enters the spare water tank via the water return pipe after acting on the water turbine, until the water in the working water tank is all transferred into the spare water tank, then the spare water tank becomes a new working water tank while the working tank becomes a new spare water tank, to generate the electrical energy.

* * * * *